(12) United States Patent
Ratliff (10) Patent No.: US 6,243,239 B1
(45) Date of Patent: Jun. 5, 2001

(54) STRAIN RELIEF FOR AN ACTUATOR COIL

(75) Inventor: Ryan T. Ratliff, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/183,584

(22) Filed: Oct. 30, 1998

Related U.S. Application Data (60) Provisional application No. 60/075,796, filed on Feb. 24, 1998.

(51) Int. Cl.[7] ........................................ G11B 5/55
(52) U.S. Cl. ............................................... 360/265
(58) Field of Search ..................... 360/106, 265, 360/264.2

(56) References Cited

U.S. PATENT DOCUMENTS

| | | |
|---|---|---|
| 5,012,368 | 4/1991 | Bosier et al. . |
| 5,146,450 | 9/1992 | Brooks et al. . |
| 5,262,907 | 11/1993 | Duffy et al. . |
| 5,455,728 | 10/1995 | Edwards et al. . |
| 5,482,381 | 1/1996 | Krum et al. . |
| 5,491,598 * | 2/1996 | Sricklin et al. ................ 360/106 |
| 5,539,595 | 7/1996 | Beck et al. . |
| 5,654,848 | 8/1997 | Maiers et al. . |
| 5,764,440 | 6/1998 | Forbord . |
| 5,808,838 | 9/1998 | Battu et al. . |
| 5,818,665 | 10/1998 | Malagrino, Jr. et al. . |
| 6,061,206 | 5/2000 | Foisy et al. . |

\* cited by examiner

Primary Examiner—Robert S. Tupper
(74) Attorney, Agent, or Firm—Crowe & Dunlevy (57) ABSTRACT

An apparatus and associated method for providing a strain relief in support of a medial portion of a terminal end of an electrical wire that is used in the construction of an actuator coil for a disc drive assembly. The strain relief apparatus has a base that is attached to the actuator assembly, an upstanding post around which the electrical wire is wrapped to provide a frictional engagement between the wire and the post, and a flange depending from a distal portion of the post to urge the wire onto the post and retain the wire about the post during routing of a distal portion of the terminal end that is associated with manufacturing steps of electrically connecting the actuator coil to the disc drive control system. In a preferred embodiment the strain relief has a pair of posts so that each terminal end is wrapped individually about one of the posts. In an alternative preferred embodiment the strain relief has a single post about which both terminal ends are wrapped.

11 Claims, 6 Drawing Sheets

STRAIN RELIEF FOR AN ACTUATOR COIL

RELATED APPLICATIONS

This application claims the benefit of U.S. Provisional Application No. 60/075,796 entitled COIL STRAIN RELIEF POST, filed Feb. 24, 1998.

FIELD OF THE INVENTION

The present invention relates generally to the field of disc drive data storage devices, and more particularly but not by way of limitation, to an apparatus and a method for providing a strain relief in support of the terminal end of an electrical wire used in the construction of the disc drive actuator coil.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Generally, the actuator assembly has an actuator body that pivots about a pivot mechanism disposed in a medial portion thereof. A motor, such as a voice coil motor, selectively positions a proximal end of the actuator body. This positioning of the proximal end in cooperation with the pivot mechanism causes a distal end of the actuator body, which supports the read/write heads, to move radially across the face of the discs.

The voice coil motor involves an electrical coil and a magnet assembly that interact to produce an electro mechanical force that moves one with respect to the other. In some designs the magnet assembly is supported by the actuator assembly and thereby pivots with respect to a stationary electrical coil; conversely the electrical coil can be supported by the actuator assembly for pivoting relative to a stationary magnet assembly.

In either case, the electrical coil is produced from a very fine conductive wire which is wound to form a coiled portion. Both ends of the coiled wire are left extending from the coiled portion, these terminal ends thereby routed and connected to the flex circuit for connection to the control system. In this manner, the control system sends controlled currents to the electrical coil in order to effectuate movement of the actuator assembly.

The assembly process in manufacturing the disc drive, whether done manually or robotically, requires grasping the terminal ends and directing a distal portion thereof to the circuit board for electrical connection, such as by a suitable soldering process. These tensile forces tend to pull the wires loose from the electrical coil, and can lead to wire damage or breakage, or damage to the wire insulation.

There is a long-unresolved need in the industry for a method and accompanying apparatus to provide a strain relief support of the wires at a position medially disposed between the electrical coil and the distal portion of the terminal end. Such a strain relief could prevent expensive scrap and rework of actuator assemblies by absorbing tensile forces imparted to the terminal ends, and preventing the forces from reaching the windings of the electrical coil.

SUMMARY OF THE INVENTION

The present invention is directed to a strain relief apparatus and a method for routing the electrical leads of an actuator coil relative to the strain relief apparatus in order to prevent damage to the actuator coil during normal assembly operations involved in routing and electrically wiring the actuator assembly of a disc drive.

The strain relief apparatus has a base that supports one or two upstanding posts around which the terminal ends of the electrical wire are wrapped thereabout before routing the wires to a circuit board for electrical connection. Wrapping the wire about the strain relief post causes a frictional engagement between the wire and the post so that tension in the wire downstream of the strain relief, that is, between the post and the circuit board, is transmitted to the post and thereby not transmitted to the wire making up the windings of the actuator coil The strain relief base is attached to the actuator assembly in a conventional manner, such as by an adhesive. A flange depends from the post to urge the wire onto the post and to retain the wire about the post during the routing and connection stages of electrically connecting the actuator coil to the disc drive control system.

With the strain relief supported by the actuator assembly, the terminal ends extending from the actuator coil are first wrapped around the posts of the strain relief and then routed

DETAILED DESCRIPTION

Figure 1:
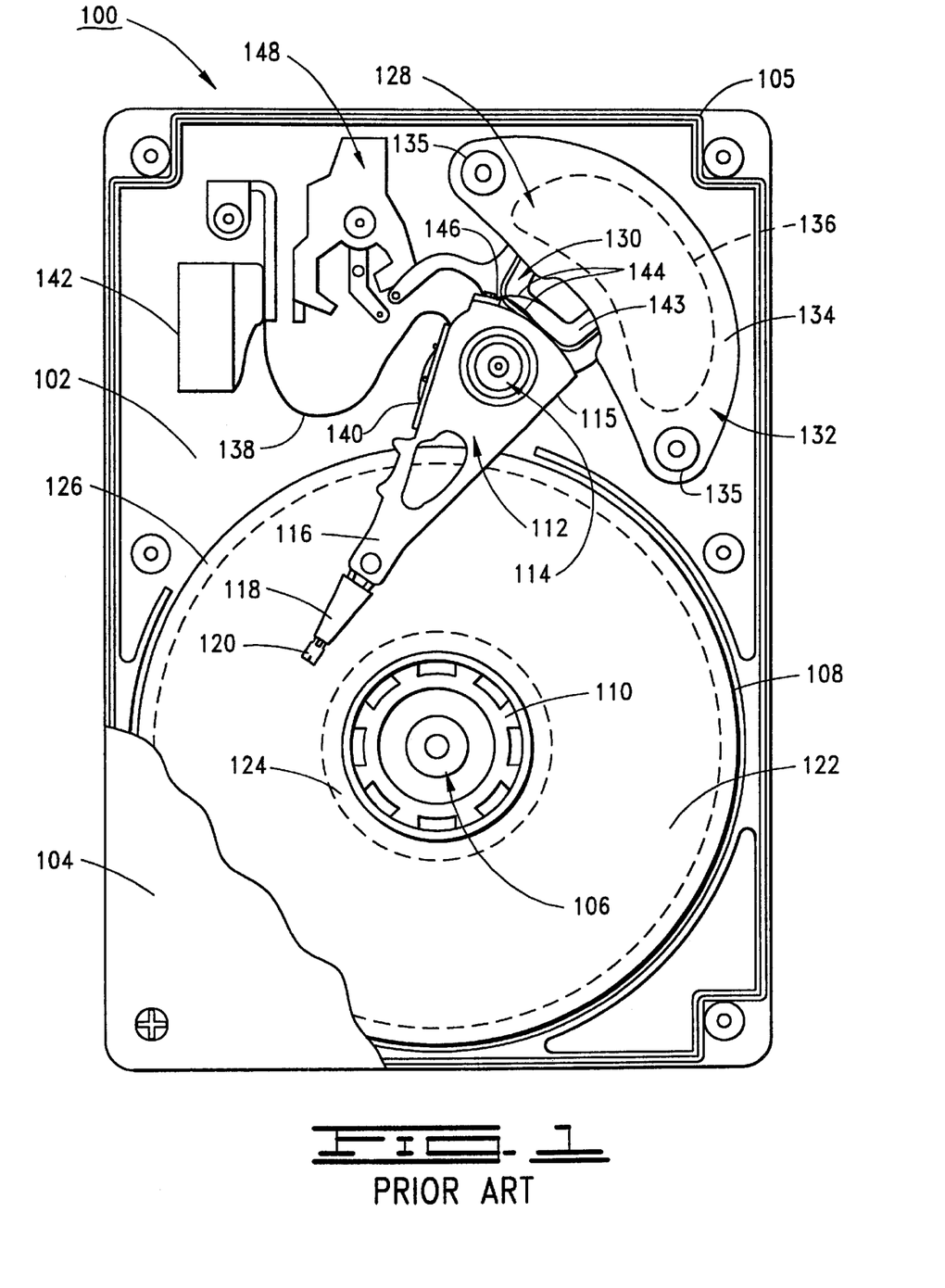
FIG. 1 is a plan view of a prior art disc drive that is particularly well suited to the practice of the present invention.

Referring to the drawings in general, and more particularly to FIG. 1, shown therein is a plan view of a disc drive 100 constructed in accordance with a preferred embodiment of the present invention. The disc drive 100 includes a base deck 102 to which various disc drive components are mounted, and a cover 104 which together with the base deck 102 and a perimeter gasket 105 provide a sealed internal environment for the disc drive 100. The cover 104 is shown in a partial cut-away fashion to expose selected components of interest. It will be understood that numerous details of construction of the disc drive 100 are not included in the following description because they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118, in turn, support read/write heads 120, with each of the read/write heads 120 adjacent a surface of one of the discs 108 and maintained in a data reading and writing spatial relationship by a conventional slider assembly (not shown) which supports each read/write head 120 in response to air currents generated by the spinning discs 108 during operation of the disc drive 100.

Each of the discs 108 has a data storage location with a data recording surface 122 divided into concentric circular data tracks (not shown), and the read/write heads 120 are positionably located adjacent data tracks to read data from or write data to the tracks. The data recording surface 122 is bounded at an inner extent by a circular landing zone 124 where the read/write heads 120 can come to rest against the discs 108 at times when the disc drive 100 is inoperable. The data recording surface 122 is similarly bounded at an outer extent by a circular snubber zone 126 where a conventional snubber (not shown) can contact the disc 108 to limit an axial runout.

The E-block 115 is positioned by a voice coil motor (VCM) 128, the VCM 128 having an actuator coil 130 supported by the E-block 115 and immersed in a magnetic field generated by a magnet assembly 132. A magnetically permeable flux path, such as provided by a pair of steel plates 134 (sometimes referred to as a pole 134), completes the magnetic circuit of the VCM 128. In a preferred embodiment shown in FIG. 1, one pole 134 is attached to the base deck 102 and the other pole 134 is attached to the cover 104. A pair of magnets 136 are supported about the actuator coil 130, each magnet 136 supported by one of the poles 134.

When controlled current is passed through the actuator coil 130, an electromagnetic field is set up which interacts with the magnetic circuit of the magnet assembly 132 to cause the actuator coil 130 to move relative to the magnets 136 in accordance with the well-known Lorentz relationship. As the actuator coil 130 moves, the E-block 115 pivots about the pivot bearing assembly 114 causing the actuator arms 116 to move the read/write heads 120 adjacent to, and radially across, the discs 108.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 138. The head wires are secured by way of a suitable soldering process to corresponding pads of a printed circuit board (PCB) 140.

As is conventional, the actuator coil 130 is formed from an electrical wire which is shaped to form an active coil portion 143 comprising a plurality of adjacent turns of the electrical wire which magnetically interact with the magnet assembly 132. A pair of terminal ends 144 extend from the active coil portion 143. To provide the controlled current to the actuator coil 130, the terminal ends 144 are routed from the active coil portion 143 to a printed circuit board 146 and secured by way of a suitable soldering process. The printed circuit board 146 is likewise connected to the flex circuit 138.

The flex circuit 138 is connected to a flex circuit bracket 142 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

Finally, one skilled in the art will recognize the use of a latching assembly 148 that locks the actuator assembly 112 in a parked position when the read/write heads 120 have been moved to the landing zone 124 and the disc drive is inoperable.

Figure 2:
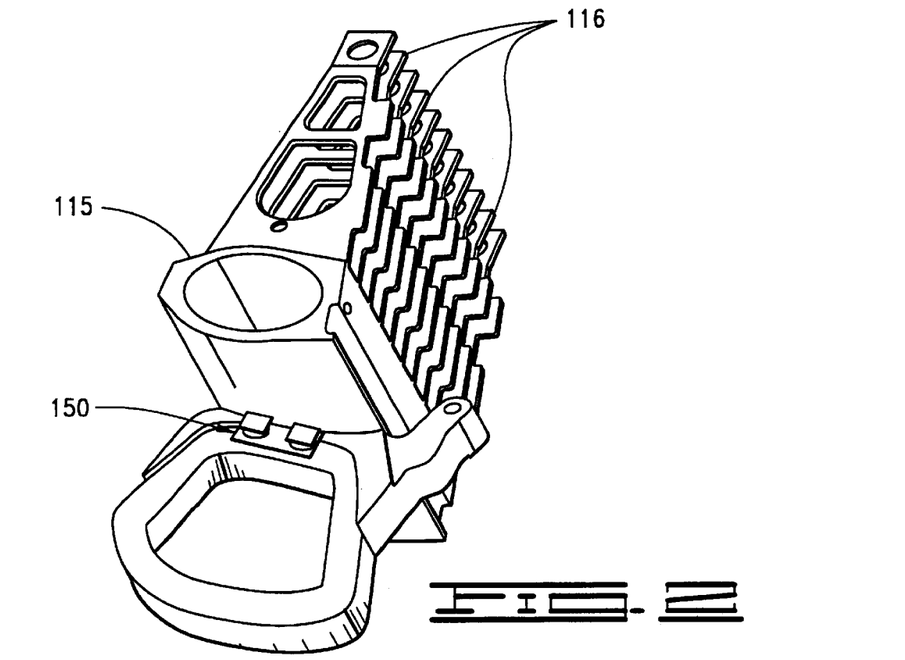
FIG. 2 is a perspective view of an actuator constructed in accordance with the present invention and suited for use in the disc drive of FIG. 1.

Turning now to FIG. 2, shown therein is the E-block 115 of the actuator assembly 112 of FIG. 1, shown in the manner in which the actuator coil 130 is supported for operable engagement with the stationary magnet assembly 132 (see FIG. 1). A strain relief 150 is shown attached to the actuator coil 130, such as by the use of a suitable epoxy such as the product 400-5 manufactured by Ablebond, or a suitable equivalent. The strain relief 150 provides a rigidly stationary post around which the terminal ends 144 (see FIG. 1) of the electrical wire forming the actuator coil 130 are wrapped around before routing the wires to the printed circuit board 146 for attachment to the flex circuit 138. In this manner the strain relief 150 provides support to the terminal ends 144 of the wires to prevent damage during assembly.

The strain relief 150 is preferably of a unitary construction, such as an injection molded component formed of a relatively hard, high temperature plastic material. One such material particularly well suited is the product Ultem 1000 manufactured by General Electric, or a suitable equivalent.

Figures 3, 4:
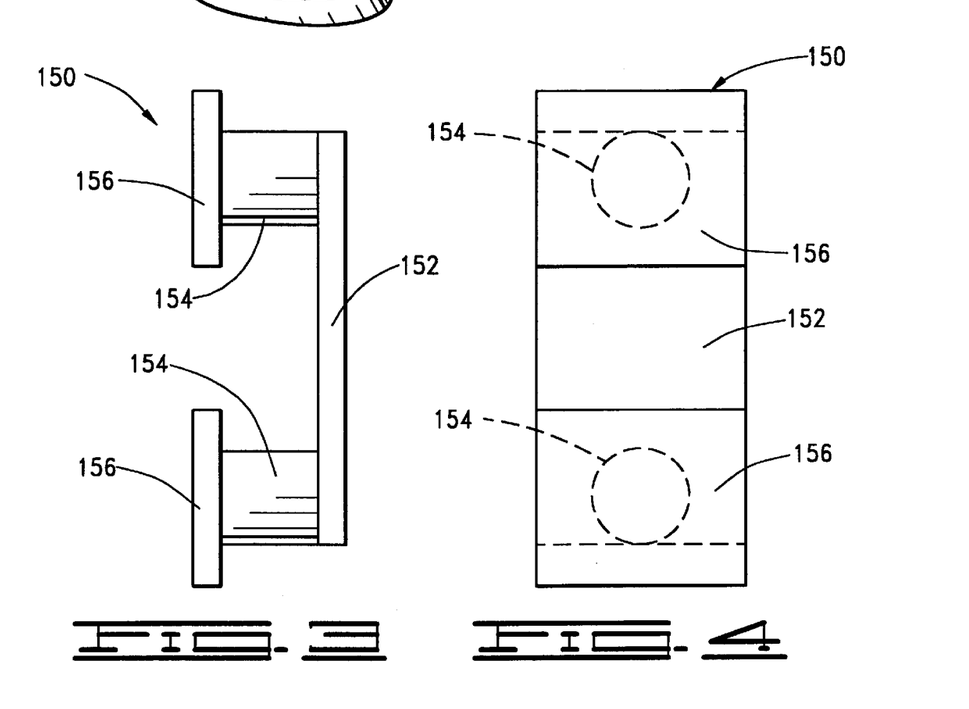
FIG. 3 is a side view of the strain relief of the actuator of FIG. 2.
FIG. 4 is a plan view of the strain relief of FIG. 3.

FIG. 3 is a side view of the strain relief 150 of FIG. 2. It will be noted a base 152 supports a pair of posts 154 in an upstanding manner. The electrical wires are wrapped around the posts 154 for frictional engagement therewith so that a tensile force placed on the wire downstream of the strain relief 150 is born by the strain relief 150 and not the actuator coil 130.

The need for ever lighter actuator assemblies 112 has required lighter actuator coils 130. One approach has been to decrease the diameter of the wire used in forming the actuator coil 130. Another approach has been to use less dense material, such as aluminum for the wire. In either case, these advances make the wires more susceptible to damage during handling operations in routing and attaching the wires to the flex circuit 138. This handling can likewise damage the nylon insulation on the electrical wire, resulting in a short circuit between windings of the actuator coil 130. It has been shown that by routing the terminal ends 144 of the wires around the strain relief 150 of the present invention the amount of wire breakage and damage is significantly decreased. It has been determined that generally two wraps of the wire around the post 154 is sufficient to affix the wire, that is, to prevent slippage of the wire around the post 154.

FIGS. 3 and 4 further show a flange 156 is supported by a distal end of each of the posts 154. The flange 156 has an enlarged cross-sectional area in comparison to the posts 154 in order to guide the wire into engagement with the post 154 and retain the wire on the post 154 during times when attachment of the distal end of the terminal portion can create slack in the wire.

Figure 5:
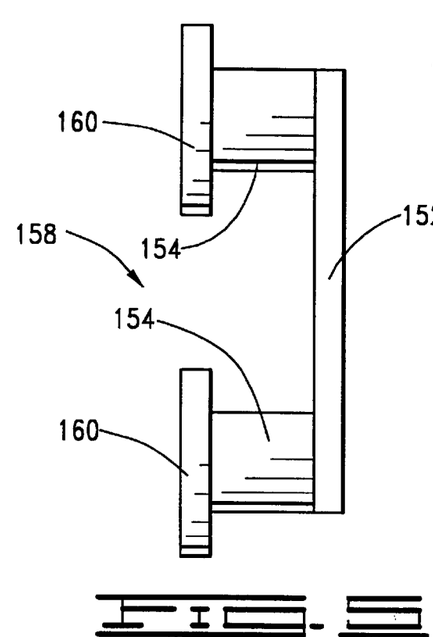
FIG. 5 is a side view of a strain relief constructed in accordance with a preferred alternative embodiment of the present invention.
Figure 6:
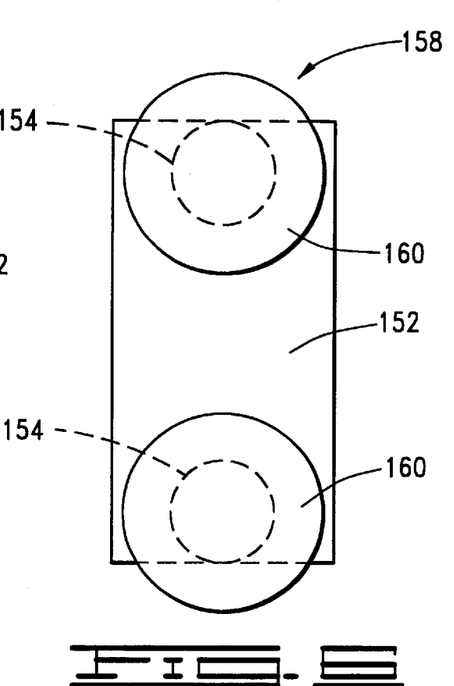
FIG. 6 is a plan view of the strain relief of FIG. 5.

FIGS. 5 and 6 show a strain relief 158 having a base 152 and posts 154 as in FIG. 3, but with a round flange 160. It has been determined that the rounded edges of the flange 160 facilitate the routing of the wire around the post 154 by reducing the obstruction provided by the flange 160 and by eliminating the pointed corners which tend to snag the wire.

Figure 7:
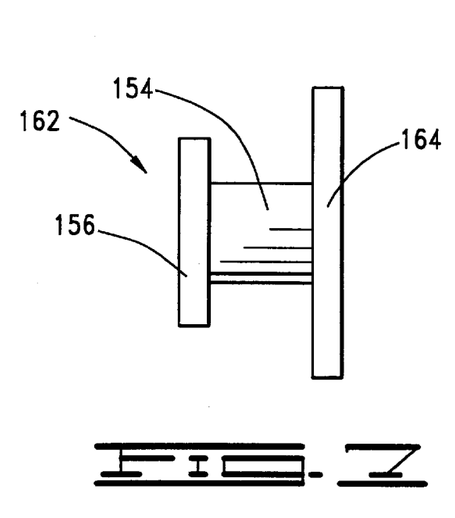
FIG. 7 is a side view of a strain relief constructed in accordance with another preferred embodiment of the present invention.
Figure 8:
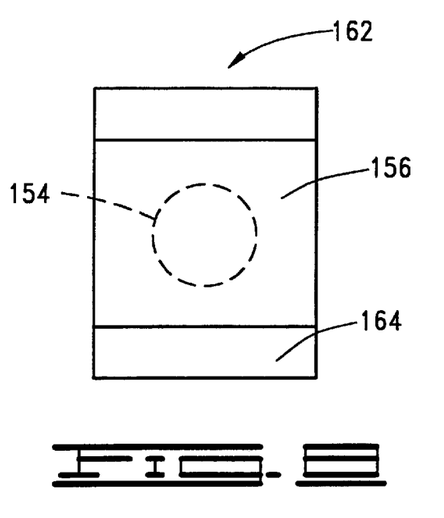
FIG. 8 is a plan view of the strain relief of FIG. 7.

FIGS. 7 and 8 show a strain relief 162 having a base 164 of a reduced size, and supporting only one post 154 rather than two. Because the electrical wire is insulated, typically with an epoxy, the two terminal ends 144 can be wrapped together around one post 154. Combining the terminal ends 144 to one post 154 presents certain logistical difficulties, however, in that the terminal ends 144 must be matched with the appropriate pad on the printed circuit board 146. Combining the terminal ends 144 around a single post 154 makes it more difficult to maintain the identity for appropriate connection to the printed circuit board 146, thus making it more likely that the actuator coil 130 can be wired backward.

Figure 9:
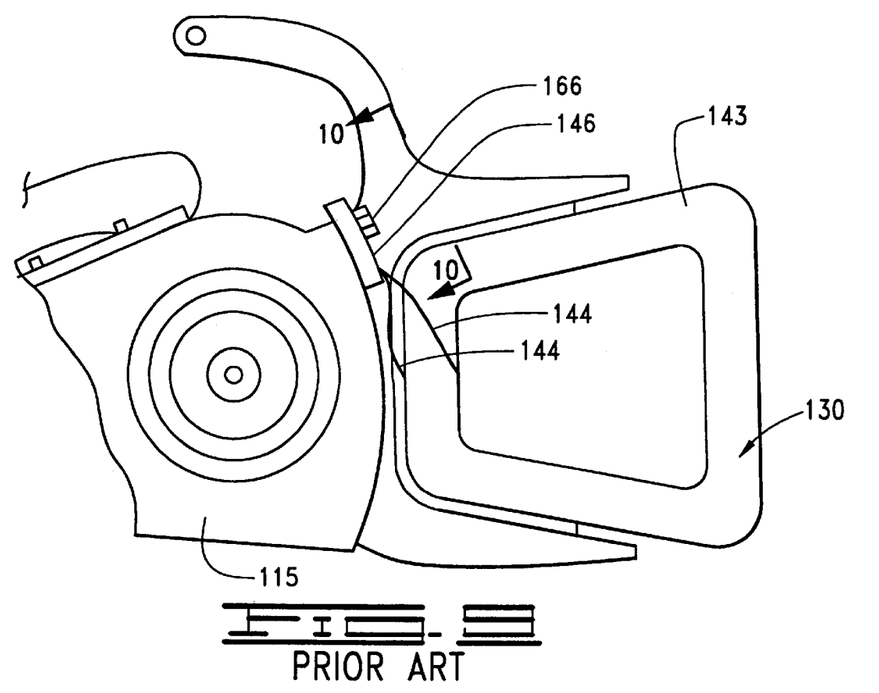
FIG. 9 is a plan view of a portion of a prior art actuator showing the method of routing the terminal ends of the electrical wire that forms the actuator coil.

FIG. 9 is an enlarged view of a portion of the actuator assembly 112 of the prior art disc drive 100 of FIG. 1, wherein the terminal ends 144 of the electrical wire are shown extending from the actuator coil 130, thereat being routed and attached to the printed circuit board 146. The printed circuit board 146 is typically attached to the E-block 115 for support by a fastener 166 that threadingly engages the E-block 115.

Figure 10:
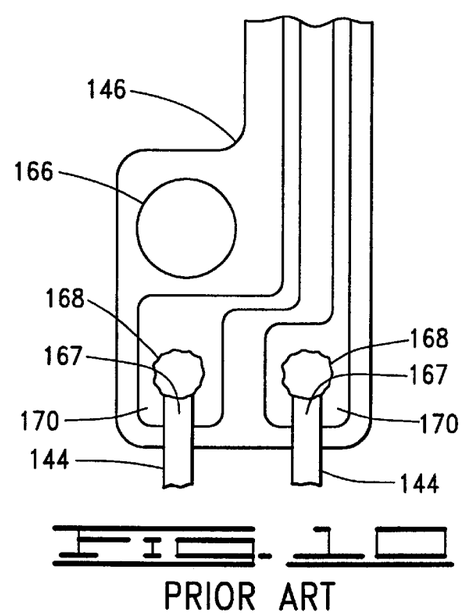
FIG. 10 is a projected view taken along the line 10—10 of FIG. 9.

FIG. 10 is a view from a perspective along the projection line 10—10 of FIG. 9 showing the attachment of distal portions 167 of the terminal ends 144 by a suitable solder 168 to a pad 170 of the printed circuit board 146.

Figure 11:
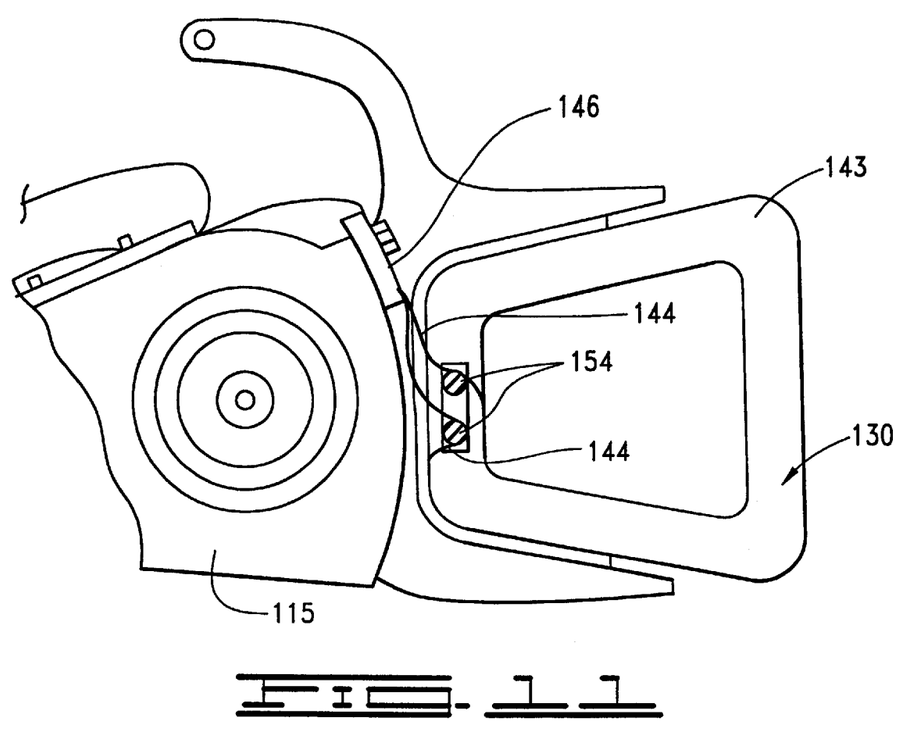
FIG. 11 is a plan view of a portion of an actuator constructed in accordance with a preferred embodiment of the present invention, showing the method of routing the terminal ends of the electrical wire that forms the actuator coil.

Finally, FIG. 11 shows a portion of the actuator assembly 112 of FIG. 2 that is constructed in accordance with a preferred embodiment of the present invention, whereby the terminal ends 144 are wrapped around the posts 154 of the strain relief 150 before being routed toward and attached to the printed circuit board 146. It will be noted that the flanges 156 are not shown for clarity in showing the terminal ends passing around the posts 154 between the actuator coil 130 and the printed circuit board 146. In this manner a resistive force, or strain relieving force, is provided for each terminal end 144 in that portion between the strain relief 150 and the coil 130, so that tension imparted to the terminal end 144 downstream of the strain relief 150, or between the circuit board 146 and the strain relief 150, is not transmitted to the actuator coil 130. One skilled in the art will recognize the benefit associated with protecting the actuator coil 130 from forces during assembly of the disc drive 100 which tend to damage the terminal ends 144 at the actuator coil 130.

The resistive, or strain relieving, force is the result of a frictional engagement between the terminal end 144 and the post 154. The amount of strain relieving force is thus proportional to the surface area of wire that engages the post 154. That is, the strain relieving force increases with more wraps of the terminal end 144 around the post 154. It has been shown that two wraps provide a sufficient resistance to slippage in light of the assembly processes at hand and the tensile strength of the wire.

The present invention provides an apparatus and a method for supporting a terminal end (such as 144) of an electrical wire which is used in the construction of an electrical coil (such as 130) for a voice coil motor (such as 128) of a disc drive (such as 100). A strain relief (such as 150) is provided which has an upstanding post (such as 154) around which the wire is wrapped before routing a distal end of the terminal portion to a connecting printed circuit board (such as 146). In this manner the wire frictionally engages the post so that tension placed on the wire downstream of the post is absorbed by the post, and not transmitted along the wire upstream of the post.

The strain relief has a base (such as 152) that is supported by an actuator assembly (such as 112) of the disc drive, whereas the actuator assembly also supports the actuator coil (such as 130). In a preferred embodiment the base can be adhered to the windings of the actuator coil near the terminal ends of the electrical wire. The base supports the post, and a flange (such as 156) depends from a distal end of the post for urging the wire to remain on and about the post.

In one preferred embodiment the strain relief can have one post, about which both terminal ends are wrapped. In an alternative preferred embodiment the strain relief can have a pair of posts, about which a terminal end is wrapped about each post. It will be recognized by a skilled artisan that a two-post strain relief facilitates wire separation and routing in a manner less likely to reverse the terminal ends at the printed circuit board and thereby electrically connect the actuator coil backwards.

Figure 12:
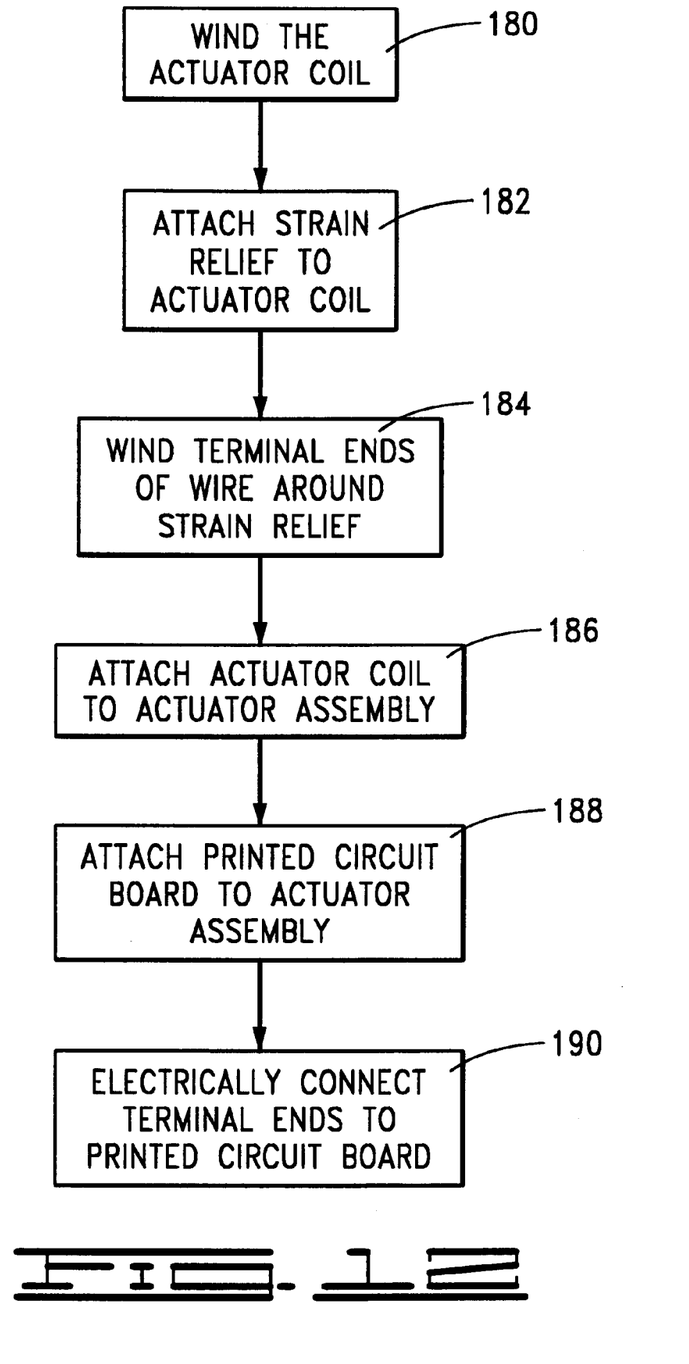
FIG. 12 is a flowchart illustrating the method of the present invention in electrically connecting a disc drive actuator assembly.

The strain relief of the present invention permits an improved method of electrically connecting the disc drive actuator assembly. FIG. 12 illustrates the following steps of the method:

(a) winding an electrical wire to form an electrical coil, leaving a pair of terminal ends extending from the actuator coil (180);

(b) attaching a strain relief to the actuator coil (182);

(c) winding a medial portion of each wire terminal end around an upstanding post portion of the strain relief (184);

(d) attaching the actuator coil to a supporting portion of an actuator assembly (186);

(e) attaching a printed circuit board to the actuator assembly, the circuit board having a flex assembly depending therefrom (188);

(f) electrically connecting each terminal end to the circuit board (190).

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. An actuator for a disc drive for operatively moving a read/write head in data reading and writing relationship to a disc, the actuator positioned by a voice coil motor having an electrical coil supported by the actuator, the electrical coil comprising an electrical wire configured to form an active coil portion comprising a plurality of adjacent turns of the electrical wire and a pair of terminal ends extending from the active coil portion, each terminal end having a distal portion electrically connected to a disc drive servo control system and a medial portion between the distal portion and the active coil portion, the active coil portion magnetically interacting with a permanent magnet of the voice coil motor to move the read/write head, the actuator comprising a strain relief supporting the medial portions of the terminal ends to relieve strain between the distal portions and the active coil portion, the strain relief comprising a base supported by the actuator and an upstanding post depending from the base, wherein at least a selected one of the medial portions is wound at least one turn around the post.

2. The actuator of claim 1 wherein the base is attached to the electrical coil.

3. The actuator of claim 2 wherein an adhesive is interposed between the base and the electrical coil the providing a joining force therebetween.

4. The actuator of claim 3 wherein the adhesive comprises an epoxy.

5. The actuator of claim 1 wherein the strain relief comprises a high temperature molded plastic.

6. The actuator of claim 1 further comprising a flange depending from a distal end of the post opposite the base to retain the at least a selected one of the medial portions on the post between the base and the flange.

7. The actuator of claim 1 wherein the medial portions are respectively characterized as first and second medial portions, wherein the post is characterized as a first post, wherein the strain relief further comprises a second post adjacent the first post, and wherein the first medial portion is wound at least one turn around the first post and the second medial portion is wound at least one turn around the second post.

8. The actuator of claim 7 wherein the strain relief further comprises first and second flanges which respectively depend from distal ends of the first and second posts opposite the base to retain the respective first and second medial portions on the first and second posts between the respective first and second flanges and the base.

9. A disc drive, comprising:

a base deck;

a disc supported by the base deck;

an actuator operatively moveable in a data reading and writing relationship to the disc;

a voice coil motor for selectively moving the actuator, the voice coil motor comprising:

an electrical coil comprising an electrical wire formed to provide an active coil portion comprising a plurality of adjacent turns of the electrical wire and a pair of terminal ends extending from the active coil portion, each terminal end having a distal portion for electrical connection to a servo control system and a medial portion between the distal portion and the active coil portion; and a magnet assembly which magnetically interacts with the active coil portion to move the actuator; and support means for supporting the medial portions of the terminal ends to relieve strain between the distal portions and the active coil portion.

10. The disc drive of claim 9 wherein the support means comprises a strain relief comprising a base affixed to the actuator and adjacent first and second posts depending from the base, wherein a selected one of the medial portions is wound at least one turn around the first post and the remaining one of the medial portions is wound at least one turn around the second post.

11. The disc drive of claim 10 wherein the strain relief further comprises first and second flanges which respectively depend from distal ends of the first and second posts opposite the base to retain the respective medial portions on the first and second posts between the respective first and second flanges and the base.

* * * * *